3,109,049
INTERFEROMETER

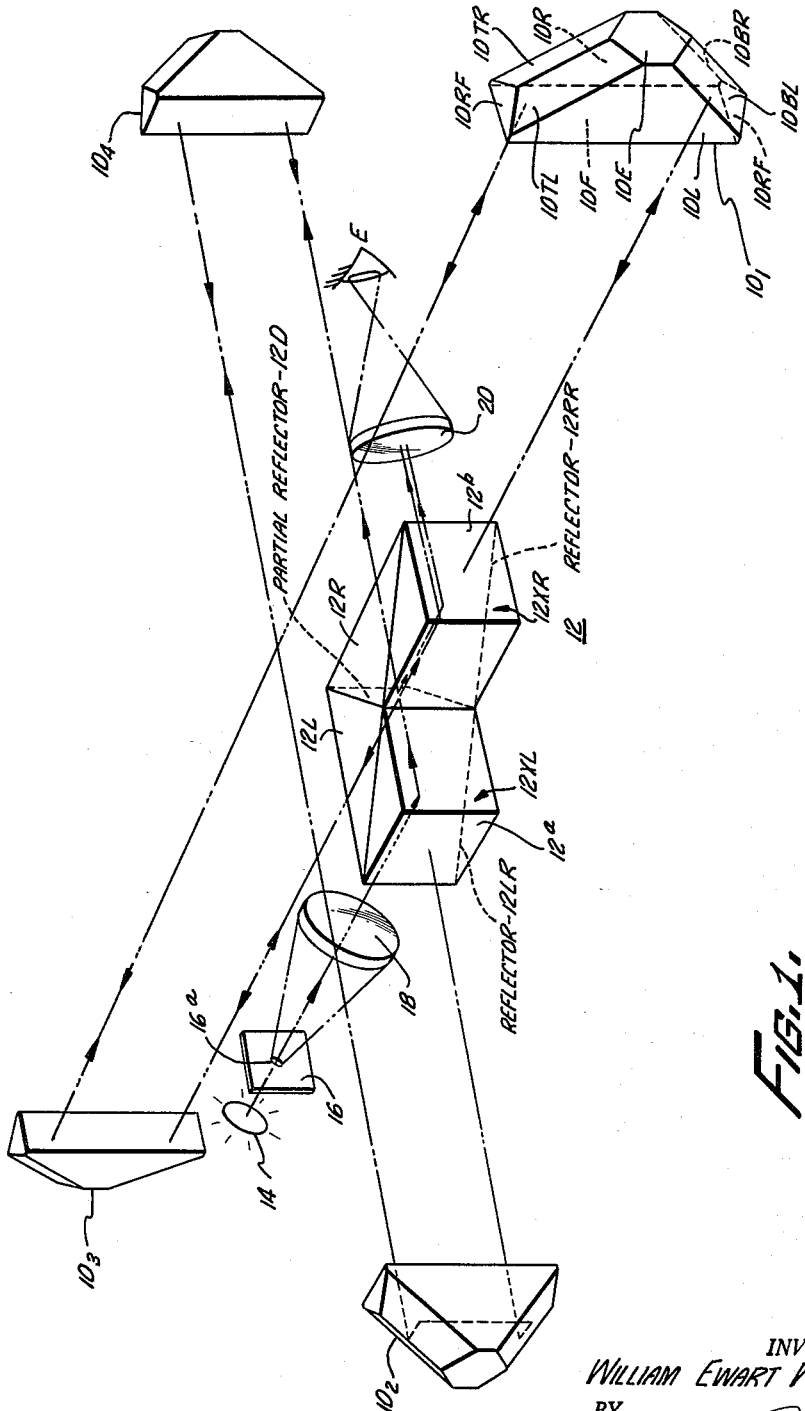

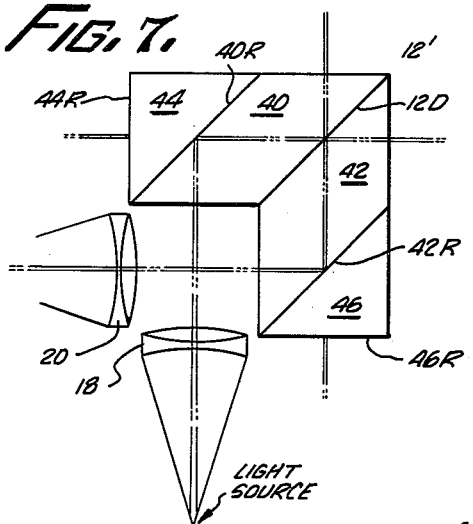
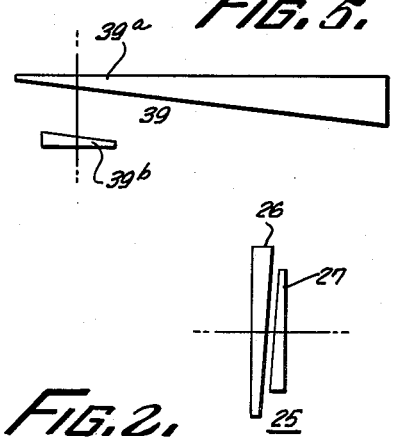
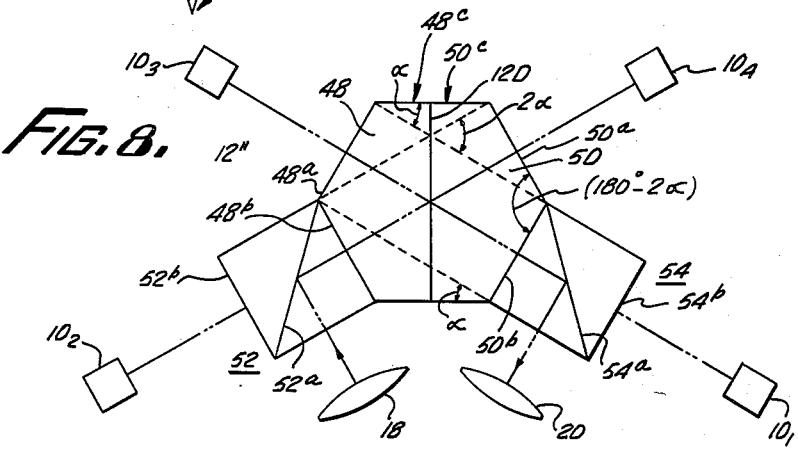
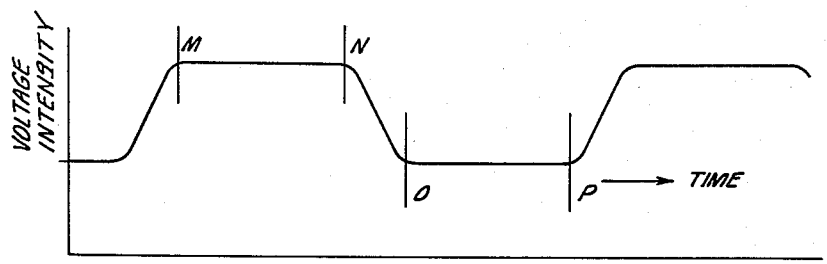
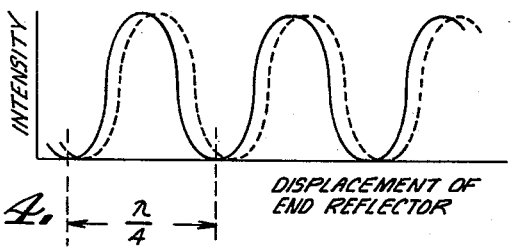

William Ewart Williams, Pasadena, Calif., assignor to Cepac, Inc., a corporation of Delaware
Filed May 19, 1960, Ser. No. 30,296
9 Claims. (Cl. 88—14)

This invention relates to optical apparatus based on the interference of light beams and more particularly to optical interferometers functioning on the division of amplitude of a light beam.

Interference apparatus may be conveniently divided into two main classes, those based on the division of wave front of a light beam and those on the division of amplitude of a light beam. An interferometer is an optical interference device used in measuring the wave length of light in terms of a standard of length, or in measuring an unknown length in terms of known wave lengths of light. The Michelson interferometer is an important example of interference apparatus functioning on the basis of the division of amplitude of a light beam. In the Michelson device, the amplitude division is obtained by means of a light divider comprising a partial reflector or half silvered plate arranged whereby the split beam is sent in quite different directions against plane mirrors and then brought back and recombined at the same partial reflector to form interference patterns or fringes. The Michelson interferometer, as well as various other types of interferometers, is adequately discussed in the text entitled "Applications of Interferometry" by W. Ewart Williams, published by Metheun & Co., Ltd., 36 Essex St. W.C., London, England in 1930. As indicated in this text, one of the plane mirrors of the interferometer is mounted on a carriage and can be moved along well machined ways or tracks. The position of the movable mirror is slowly and accurately controlled by means of a screw precisely calibrated to show the exact distance the mirror has been moved in order to provide a measure of the displacement of some physical device or object to which the movable mirror is keyed or connected. The dsiplacement of the object or device under measurement in terms of wave lengths of light may then be determined by observing the interference pattern or light fringes. It is also well known that in the Michelson type of device a light must originate from an extended source and a point or slit source will not produce the desired system of fringes. In addition, the light must, in general, be monochromatic, or nearly so, especially if the distances of the plane mirrors from the light divider are appreciably different.

In any discussion of the Michelson interferometer, or the modification of the Michelson device known as the Twyman-Green interferometer, discussed in the above-identified text by Williams, it is implicitly assumed that while the movable or "working" mirror is being displaced and the fringe movement measured, or counted, the other plane mirrors and the light divider remain fixed. Since the measurements by means of an interferometer are in terms of micro-inches, this fixed condition of the divider and the reference mirror of the interferometer is very difficult to satisfy in practice. Rigid clamping of the divider plate, in particular, to a common base is entirely impractical as this would cause distortion of the divider plate and result in the distortion of the interference fringes. The Koester interferometer comprising two similarly right angled thirty degree prisms in contact with a light divider avoids the above-mentioned problem. In the Koester instrument, however, the divided beams are traveling in the same direction and, as a result, may not be used for all types of interferometric applications.

The present invention provides an improved and more sensitive interferometer based on the division of amplitude of a beam in which the beam travels in different directions, as in the Michelson type of device, but which interferometer will stay in adjustment for an indefinite period. As a result of the elimination of the effects of displacement or rotation of the light divider, the interferometer of this invention is particularly suited to observe long term changes extending over months or years such as brought about by geophysical deformations or the degree of annealing of large castings. The interferometer is maintained in adjustment due to the physical arrangement of the light divider and two pairs of reflectors arranged to cause the light beams to traverse a selected path and to pass through the light divider twice. One pair of end reflectors receives and controllably reflects the reflected portion of the original beam received from the light divider, while the other pair of end reflectors receives and controllably reflects the portion of the original beam transmitted through the light divider. In this fashion any displacement of the light divider is compensated for in the instrument by arranging that the total distance or path traversed by the split beam is unaffected as a result of any movement, displacement or rotation of the light divider. The total path covered by the split beam is solely dependent upon the distance between the reflecting planes or end mirrors about the light divider. The reflecting end mirrors are disposed about the light divider so that the displacement of the light divider in a direction to reduce the light path to one of the end mirrors of a pair is compensated for by a corresponding increase in the light path to the other end mirror coacting therewith. In addition, since each portion of the split beam experiences two reflections in the light divider, a rotation of this divider is immaterial.

Furthermore, this invention provides an interferometer system which is twice as sensitive as the standard Michelson or Twyman-Green type of device. Specifically, since each portion of the split beam traverses its fixed path twice, a mechanical displacement of one-eighth of a wave length ($\frac{1}{8}\lambda$) of the movable mirror will cause a change of one-half wave length ($\frac{1}{2}\lambda$) in the optical path.

This invention provides an improved optical interferometer comprising a plurality of light reflecting elements each defined to receive an incident light beam on one surface thereof and reflected back on a path parallel to the incident path but displaced therefrom. Two pairs of light reflecting elements are arranged in spaced-apart relationship about a light dividing element. The light dividing element includes the usual interferometric surface having a partially reflecting and partially transmitting characteristic. In addition, the light dividing element is provided with at least a pair of totally reflecting surfaces that are externally disposed to reflect a light beam external of the light dividing element. The latter surfaces are preferably arranged as a unitary portion of the purely interferometric dividing layer of the light dividing element. The light beam utilized in the interferometer is a substantially plane wave front that is incident upon the partially reflecting surface whereby a beam is partially transmitted and partially reflected and which divided beams leave the dividing surface in a substantially perpendicular relationship. Each portion of the light beam impinges upon one of the end members of each pair spaced to receive the transmitted and reflected beams. The light reflecting elements are each similarly defined to receive an incident light beam and to back-reflect the light beam at a point displaced from the point of incidence and passing around the light dividing element without interfering with the incident beam. The beams are reflected in this manner to impinge upon the other element of each pair wherein it experiences the same displacement and is directed towards the totally reflecting surfaces of the light divider. These surfaces cause the light beam to be back-reflected and to once again traverse the same light path through each reflecting end member and finally to the partially reflecting surface of the light divider. At the light dividing layer the two beams are recombined and restored to their original level from whence it emerges from the light dividing element and into the means for observing the interference or reinforcement of the two recombined beams.

These and other features of the present invention may be more fully appreciated when considered in the light of the following specification and drawings, in which:

FIG. 1 is a simplified perspective view of the interferometer embodying the invention;

FIG. 2 is a top plan view of an adjustable error compensating unit for use in the embodiments of FIGS. 1 and 3;

FIG. 4 is a graph of the intensity of the light beam, with the displacement of an end reflector;

FIG. 5 is a top plan view of a wedge compensating unit for use in the system of FIG. 3;

FIG. 6 is a voltage intensity graph as developed on an oscillograph;

FIG. 7 is a modified light dividing element for use in the systems of FIGS. 1 and 3; and FIG. 8 is another modification of the light dividing element for use in the systems of FIGS. 1 and 3.

Figure 3:
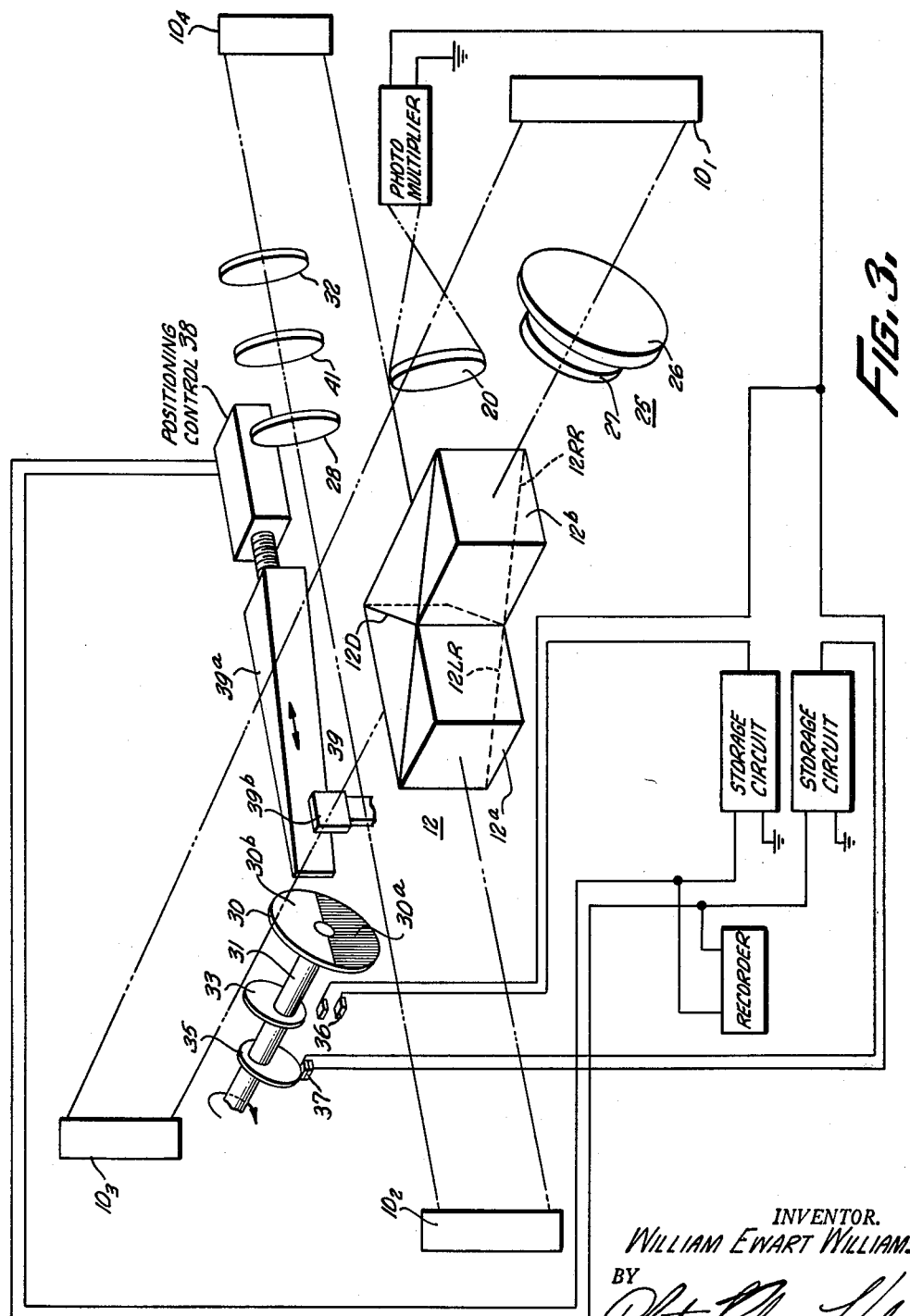
FIG. 3 is a perspective view, partially diagrammatically shown, of a complete automatically compensated interferometric system omitting the light source and collimating lens.

Prior to discussing the interferometer system of this invention a particular type of total reflecting prism or end mirror $10_1$ will be described. The end mirror $10_1$ shown in FIG. 1, suitable for use in this type of interferometer, comprises a forty-five-ninety degree prism having ninety degree roofs. The end mirror $10_1$ is defined with a plane light transmitting front surface 10F and plane side surfaces 10L and 10R. The rear end surface is defined by a plane parallel to the front surface 10F and is identified by the reference character 10E. Two pairs of forty-five degree reflecting surfaces are defined as by-passing planes through the side surfaces 10L and 10R at forty-five degree angles and intersecting one another and the rear end surface 10E. The bottom end forty-five degree reflectors are identified by the reference numbers 10BL and 10BR respectively. The forty-five degree reflecting surfaces above the end member 10E are defined in the same fashion as members 10BL and 10BR and are respectively identified by the reference characters 10TL and 10TR. The ninety degree roof members are defined by a plane normal to the plane 10F at the bottom and top surfaces thereof and intersecting the surfaces 10TL and 10TR adjacent the top ends thereof and the surfaces 10RF and 10BL adjacent the bottom ends thereof to complete the walls of the prism $10_1$. The roof members are both identified by the reference character 10RF.

When the reflecting prism $10_1$ is defined in this fashion, and arranged to receive an incident light beam arriving at the surface 10F, such as the beam shown entering adjacent the bottom of the surface 10F, the light beam will be transmitted therethrough to impinge upon the reflecting surface 10BL. The beam will then be reflected and turned through an angle of forty-five degrees due to the forty-five degree orientation of the surface 10BL to impinge upon the reflecting surface 10BR arranged adjacent thereto. The light beam will then experience another forty-five degree rotation at the surface 10BR and will be reflected towards the top forty-five degree reflector 10TR. It should be noted that in leaving the surface 10BR, the incident light beam has been rotated through an angle of ninety degrees. Upon being reflected from the surface 10TR, the light beam experiences a further forty-five degree reflection and is directed towards the reflecting surface 10TL. The incident beam is reflected from the surface 10TL out towards the front face 10F and again experiences a rotation of forty-five degrees. The total rotation caused by the reflecting surfaces 10TR and 10TL is another ninety degree orientation, and consequently causes the incident light beam to leave the prism $10_1$ from the surface 10F in a plane parallel to the entering light beam but vertically displaced therefrom.

The ninety degree roof construction provided by the elements 10RF for the prism $10_1$ eliminate any deviation of the reflected beam due to a rotation of the prism parallel to the surface 10F, as well as any rotation about an axis perpendicular to the plane of the paper.

Strictly, this is true of the rotation occurring about a point of intersection of the roof planes but any practical motion will be small so that the real error will be a second order of small differences.

An important feature of the end prism $10_1$, as contrasted with the other total reflecting prisms that provide the desired reflection and displacement of an incident beam, such as a trihedral prism, is that the prism $10_1$ may be "localized" to correct for local variations in the refractive index of the optical material of which the prism is constructed. In the conventional trihedral prism localization is not possible due to the peculiar path of the light rays therein.

Now referring to FIG. 1 proper, the concept of the interferometric system of this invention will be discussed. The interferometric device of this invention includes two pairs of reflecting end prisms, each of identical construction, disposed about the light dividing element 12. These end prisms are identified by the reference characters $10_1$, $10_2$, $10_3$ and $10_4$ arranged in a clockwise fashion from the prism $10_1$. The light source 14 is arranged adjacent a diaphragm 16 and is focused on to a pin hole $16^a$ of the diaphragm which is arranged at the focal point of an objective lens 18 to direct a parallel beam into the light divider 12. The exact position of the pinhole $16^a$ may be found by observing the back-reflected image on the lens side of the diaphragm 16 and bringing it into coincidence with the pinhole $16^a$. The light beam emanating from the well corrected objective lens 18 provides a substantially plane wave front to be incident on the light dividing layer 12D of the light divider 12. The light beam emerging from the light divider 12 impinge upon a viewing lens 20. The viewing lens 20 acts as a collector lens to focus the light beam to a small area when the eye pupil or a photocell is placed for viewing.

The light reflector 12 is defined as a unitary body comprising two identical right-angled prisms identified by the reference characters 12L and 12R constructed of well annealed homogeneous optical glass, quartz or other suitable material. The two acute angles of the prisms 12L and 12R are forty-five degree angles, as is well understood. The two prisms 12L and 12R are cemented together back-to-back whereby a dividing layer 12D is defined between the cemented surfaces. The dividing layer or surface 12D may be defined by half silvering or aluminizing the cemented surfaces of the prisms 12L and 12R. This dividing layer 12D may also be prepared by applying coatings of high and low index material of such thickness that the layer 12D transmits an amount of light approximately equal to that it can reflect. The latter-mentioned specification for the dividing layer is true for all methods of preparing the dividing layer 12D. The surfaces of the prisms 12L and 12R forming the base of the right angles are prepared as total reflecting surfaces and are further identified by the reference characters 12LR and 12RR respectively. Another pair of similarly defined ninety degree prisms 12XL and 12XR are positioned with their hypotenuses abutting the reflecting surfaces 12LR and 12RR respectively. The vertical surface of the prism 12XL is further defined as a total reflecting surface $12^a$ to back-reflect a light beam incident thereon externally of the light divider 12 proper. The vertical surface of the prism 12XR is similarly defined as a total reflecting surface $12^b$ to reflect a light beam impinging on the light divider 12. The reflecting surface $12^a$ is arranged to receive and reflect back in a coincident path the light beam from the end prism $10_2$ arranged in a parallel and spaced relationship therewith, on the left hand side of FIG. 1, while the reflecting surface $12^b$ is similarly arranged to reflect the light beam from the adjacent light prism $10_1$. The end prism $10_3$ is spaced from the light divider 12 and disposed relative thereto to receive the portion of the light beam reflected from the light divider 12D. The end prism $10_4$ is similarly disposed to receive the portion of the light beam transmitted by the divider 12D.

The essential elements of the light divider 12 may now be seen to comprise the partial reflecting and transmitting surface 12D arranged at a ninety degree angle with the total reflecting surfaces 12LR and 12RR to control the path of the light beam within the light divider. The total reflecting surfaces $12^a$ and $12^b$ control a light beam impinging thereon externally of the light divider 12, while the remaining external surfaces are light transmitting surfaces.

The theory of operation of the interferometer of this invention may now be more closely examined with the above structure in mind. The light beam originating from the light source 14 and incident on the light divider 12 is a substantially plane wave front. The light beam emerging from the lens 18 is transmitted through the front surface of the light divider and impinges on the total reflecting surface 12LR. Since the reflecting surface 12LR is disposed at an angle of forty-five degrees relative to the entering light beam, the beam is received and reflected to the partial reflector 12D, from whence it is partially transmitted therethrough and partially reflected. The portion of the beam that is transmitted through this surface passes out of the light divider 12 proper and impinges on the end member $10_4$, arranged in the top right hand section of FIG. 1. The reflected beam in turn passes out of the light divider 12 at an angle normal to the transmitted beam and impinges on the end member $10_3$, arranged in the top left hand corner of FIG. 1. Ignoring this latter light beam for the present, the path of the transmitted light beam from the end top member $10_4$ will now be traced. The beam impinging upon the end member $10_4$ will be subjected to the reflections of the four forty-five degree surfaces and emerge adjacent the top of the member $10_4$, as described hereinabove. The beam is vertically displaced from its original path whereby it not only does not interfere with the entering light beam but passes over the top of the light divider 12 to be received by the end member $10_2$ arranged on the opposite side of the divider 12. It will, of course, be recognized that the arrangement of the end prism $10_4$ may be such as to be vertically displaced and thereby cause the reflected light beam to pass under the light divider 12 or horizontally displaced and pass to either side thereof. In any event, the light beam experiences the same reorientation at the end member $10_2$ and is reflected therefrom towards the light divider 12 to impinge upon the total reflecting surface $12^a$. Upon impinging upon the reflecting surface $12^a$ the light beam is back-reflected in a coincident path to the member $10_2$ once again and will traverse the same entering path back towards the end member $10_4$. Upon leaving the member $10_4$, the light beam maintains its original path and returns to the light divider 12 at the dividing surface 12D. The reflected light beam will then again be divided in amplitude at surface 12D. The portion that is transmitted will find its way back to the source 14 and is of no significance for a measurement or to the observer. The portion of the light beam that is reflected at 12D will be caused to impinge upon the total reflecting surface 12RR and from which surface it is reflected out of the light divider 12 to the lens 20 for observation or recording.

It should be noted that the light beam travels between the end members $10_2$ and $10_4$, as described immediately hereinabove, and the total distance traversed by the light beam may be fixed by fixing the distance between the end members $10_2$ and $10_4$. Accordingly, any movement of the light divider 12 towards, or away from one of the end prisms will be accompanied by a corresponding opposite change in distance with respect to the other end member and, since the light beam traverses this path twice, the total distance travelled by the light beam will remain the same. Therefore, any displacement, movement or rotation of the light divider 12 will not effect the total path travelled by this light beam.

Now returning to complete the tracing of the path of the portion of the light beam that was reflected from the partial reflecting surface 12D to the end member $10_3$, it should now be appreciated that this beam will emerge therefrom in a parallel path adjacent the top of this end member. This beam will also travel over the light divider 12 and not interfere with the light beam travelling between the end prisms $10_2$ and $10_4$. This beam will then emerge or be incident upon the opposite end member $10_1$ adjacent the top thereof, emerge from the bottom thereof and impinge upon the reflecting surface $12^b$ of the light divider 12. The beam will be reflected back on its path, as it is reflected from the surface $12^b$ and return to the light divider by the same path through the end member $10_3$, back to the light dividing surface 12D. It will experience the same light division as discussed hereinabove for the transmitted portion of the beam, and the portion that is transmitted by surface 12D will be transmitted to the total reflecting surface 12RR and out of the divider 12 to the lens 20.

After the two beams are recombined in this fashion, if the optical paths are equal, the two beams will reinforce at the focal plane of the lens 20 and the eye placed adjacent this point will see a fully illuminated field. If one path is one-half of a wave length ($\frac{1}{2}\lambda$) longer than the other, the observed field will be uniformly dark provided the amplitudes of the two beams are equal. Since each beam traverses its path twice, a mechanical displacement of one of the end members $10_1 \ldots 10_4$, equivalent to one-eighth of a wave length ($\frac{1}{8}\lambda$) will cause a change of one-half of a wave length in the optical path. Thus the present interferometer is twice as sensitive as the standard Michelson or Twyman-Green types and which types require a physical displacement of an end member of one-fourth of a wave length to produce the same change in optical path of one-half of a wave length.

An important advantage of this invention due to the double traversal of the optical path results in not only increasing the sensitivity of the present interferometer but also eliminating any error due to the displacement of the light divider 12. The elimination of error due to the displacement of the light divider 12 may be seen when it is recognized that an increase in one path length is accompanied by a corresponding decrease in the other associated path length but that the total path length remains fixed as a result of fixing the distance between the cooperating pairs of end members. Again referring to the standard Michelson type of interferometer, it is known that in this device any change in position of the dividing element or half-silvered element causes an error to be produced since a decrease in one path length is accompanied by an increase in the other path length and which changes in path lengths are not compensated for since the beam does not travel through the divider twice as in the present invention. In addition, each light beam in accordance with the present invention experiences two reflections in the purely interferometric portion of the light divider 12 and hence a rotation of the divider 12 will not produce any measuring errors. Only the relative separations of the four end prisms $10_1 \ldots 10_4$ can alter the fringe system and a change of one of these members can only be a simple displacement of that system across the field of view. It is impossible to "spread the fringes."

Normally, the radiation is arranged to emanate from a small aperture at the focal plane of a well-corrected objective lens so that the substantially plane wave front incident on the partially reflecting surface of the divider is partially reflected and partially transmitted. The path difference over which sufficiently clear fringes can be obtained, assuming the radiation is sufficiently monochromatic, depends on the angular aperture that this equivalent source subtends at the nodal point of the objective lens. Rayleigh's criterion for a substantially clear image, in which in this case is an interference fringe, is that the wavefront departs from its correct form by more than one-fourth $\lambda$.

If we have a physical path difference D between the paths of the two beams in the interferometer at any given time, the optical path difference between the beams emanating from the center of the aperture or equivalent source will be $2\mu D$, where $\mu$ is the index of the space (in the present interferometer this is $4\mu D$). The light from the aperture edge makes an angle $\theta$ with the axis so that the optical path difference is now $2\mu D \cos \theta$, or $4\mu D \cos \theta$. $\theta$ is also $r/f$ where "r" is the radius of this aperture and "f" the focal length of the objective lens. Writing $\mu = 1$ for an interferometer in air and applying Rayleigh's criterion we have:

$$2D(1-\cos \theta) = \frac{\lambda}{4}$$

or, for the present invention $$4D(1-\cos \theta) = \frac{\lambda}{4}$$

since $$(1-\cos \theta) = \frac{\theta^2}{2} - \frac{\theta^4}{4}$$

etc.

$$\frac{2Dr^2}{2f^2} = \frac{\lambda}{4} \qquad \frac{4Dr^2}{2f^2} = \frac{\lambda}{4}$$

$$r^2 = \frac{\lambda f^2}{4D} \qquad r^2 = \frac{\lambda f^2}{8D}$$

or maximum size of $r =$ $$r_m = \frac{\sqrt{\lambda}}{\sqrt{D}} \frac{f}{2} \quad (A) \qquad r_m = \sqrt{\frac{\lambda}{8D}} \times f \quad (B)$$

It should be noted that the optical path in (B) is twice that of (A) for the same physical displacement D of the mirrors.

To see what dimensions are implied, suppose $f = 10$ inches and $\lambda = 21.5$ microinches (green mercury line). Let us take a value for D of 4 inches for cases A and B above. Then substituting in the above equations $r_m = .0118$ inch and the diameter is .0236 inch for prior art devices, while $r_m = .08345$ inch and a diameter of .017 inch for the present invention.

When the path difference due to a mirror displacement is automatically compensated for by introduction of a glass path as shown in FIG. 3, the value of $D \approx 0$ so that $r$ can be as large as desired. It is only when we are in effect "counting fringes" as in FIG. 1 that the aperture size (i.e. $r$) is important. It will be obvious that the radiation must be sufficiently monochromatic that clear interference fringes are obtainable over the distance D which is to be measured.

As it will be recognized by those skilled in the optical art, the above-described interferometer may be difficult to reproduce physically due to the inability to construct all the parts and elements of the interferometer to a degree of exactness to give the desired fringe pattern. This difficulty, however, can be avoided by utilizing an adjustable error corrector system 25 in the air path of one arm of the interferometer while a plane parallel compensating plate 28 is placed in another one of the interferometer arms. This arrangement produces a very slight tilting of the wave fronts, on the order of a few seconds of arc. One of the wedges 26 or 27 may be rotated to get any desired deviation, while the rotation of both by the same amount will produce a deviation in any desired direction or azimuth.

The adjustable correcting wedge unit 25 that is used with one arm is shown in detail in FIG. 2 and incorporated into the arm of the complete interferometer system shown in FIG. 3. The adjustable wedge unit 25 comprises two wedges 26 and 27, each constructed of homogeneous optical material with one face of each defined as a plane surface and the other faces having equal wedge angles of about fifteen to twenty seconds. In practice, the two wedges 26 and 27 are mounted in a separate, circular mount, as shown in FIG. 3, wherein they are arranged and suitably supported in the arm of the interferometer between the reflecting surface $12^b$ and the end member $10_1$. The mounting of the wedge elements 26 and 27 may be further arranged to allow one of these elements to be rotated in its own plane without disturbing the position of the other or the mounting may be such that both wedges 26 and 27 may be simultaneously rotated into any azimuth. Cooperating with the adjustable wedge unit 25 is the plane parallel plate 28 positioned in the path of the light beam passing over the light divider 12 between end members $10_2$ and $10_4$. The plane parallel plate 28 may also be mounted in a circular mount and supported in the desired light path in any suitable fashion.

Alternatively, a less expensive method of error correction is to employ one of the wedges 26 and 27 of the system 25 in different arms of the interferometer and thereby eliminate the need for the compensator plate 28.

In order to assure that the correct compensation for differences in glass paths is produced by the combination of the adjustable wedge unit and the parallel plate, equality of the optical thickness of the plate 28 to the center optical thickness of the wedges 26 and 27 can be obtained by optically contacting the wedges with the wedge angles opposed, as shown in FIG. 2. One side of the contacted wedges 26 and 27 and one side of the parallel plate 28 are further arranged in contact with a thick optical flat surface and the outer surfaces ground and polished together.

When the interferometer of the present invention is utilized to observe slow changes extending over months or years, some corrective means is preferable, but not essential, to compensate for the longitudinal movement of one of the four end members $10_1 \ldots 10_4$. This compensation has long been effected by using a parallel plate at an angle to the light beam and moving the parallel plate through a slight angle to provide the desired compensation. Another well-known means of producing this compensation is through the use of two opposed glass wedges arranged longitudinally across the beam and with one wedge fixed and the other wedge is adapted to traverse the field either horizontally or vertically in accordance with the desired correction.

A preferred method of making the wedge displacement correspond to and correct the effect of a change in the optical path due to a longitudinal displacement of one of the end members as proposed herein is a dynamic variation of the half-shade method originated for static observations by Kennedy and described in the Proceedings of the National Academy of Science in Washington, vol. 12, page 621, published in 1926. This dynamic application of the Kennedy scheme referred to utilizes a plane parallel plate 30, mounted on a shaft 31, and which plate is constructed of a homogeneous optical material having a layer of transparent light transmitting material $30^a$, about one-twentieth of a wave length thick deposited on one half of one face thereof. The layer 30$^a$ merely retards a light beam passing therethrough. The plate 30 is mounted on a rotatable shaft 31 so that the plate is normal to the light beam passing to or from the prisms for the arm in which the plate is arranged. In the system of FIG. 3 the plate 30 is shown in the path of the light beam travelling from the light divider 12 to the end prism 10$_3$, shown in block form. A compensating plate 32 of equal optical thickness is mounted in the other arm of the interferometer and, as shown in FIG. 3, is arranged in the path of the light beam travelling from the end member 10$_4$ to the end member 10$_2$ and in optical alignment with the parallel plate 28.

The shaft 31 is also provided with a pair of eccentrically mounted discs or cams 33 and 35 mounted to be rotatable with the shaft. The cam 33 controls the switching of a pair of contacts 36, while the cam 35 controls the pair of switch contacts 37. In the position of the shaft 31 shown in FIG. 3 the cam 33 is disengaged from the switch contacts 36 and they are accordingly in an open contact position. At this time the cam 35 is in engagement with the switch contacts 37 and places them in a closed position. The switch contacts 36 and 37 are each separately connected in series circuit relationship with the output circuit of a photomultiplier tube or the like to alternately control the application of the electrical signal therefrom to separate storage circuits, as shown. The output circuits for the storage circuits are connected to a positioning control circuit shown in block form and identified by the reference character 38. The positioning control circuit 38 in turn provides the control signal to a servomechanism for precisely controlling the longitudinal position of wedge unit 39$^a$ relative to element 39$^b$ by means of a commercially available micrometer screw system. The potentials derived from the storage circuits when an unbalanced relationship is detected causes the positioning control circuit 38 to drive the micrometer screw to position the wedge 39$^a$. This same signal may be coupled to a servo controlled potentiometer recorder which, in effect, records wedge position against time.

Micrometer screw systems with a total travel of ten inches and errors less than one micron or 40 micro-inches are now commercially available. If we equate ¹⁄₁₀₀ fringe to a 40-micro-inch displacement of a glass wedge, a ten inch displacement will correspond to 2,500 fringes, giving us a range of two and one-half million times the experimental error. Assuming the glass has a refractive index of 1.5 and remembering the beam traverses the glass twice (there is no point in making the wedge large enough to encompass both beams that enter and leave an end prism), the wedge angle required is approximately six minutes of arc, which is convenient to make.

The wedge unit 39 comprises the pair of spaced wedge elements 39$^a$ and 39$^b$. The wedge unit 39$^a$ is a relatively long wedge unit while the unit 39$^b$, cooperating therewith, is of substantially smaller length and is maintained in a fixed position, while the element 39$^a$ is moved longitudinally relative thereto. The light beam passes through the wedge unit 39 at the points where the two units 39$^a$ and 39$^b$ are in contact. The wedge unit 39 is arranged in the light path of the beam travelling from the light divider 12 to the end prism 10$_3$. It should be noted, however, that the wedge unit 39 is not in the path of this same beam as it travels from the end member 10$_3$ to the end member 10$_1$. In order to make the glass path in both arms of the interferometer approximately equal a plane parallel plate 41 is arranged in the other arm and is shown intermediate the plates 28 and 32.

Prior to discussing the adjusting operation utilizing the adjustable wedge unit 39, a closer examination of the function of the step or retarding plate 30 is necessary. It is assumed that the rate of change of the optical paths of the interferometer, measured in fringes per second, is low compared with the chopping speed of the disc 30. With the shaft 31 continually rotating and when the light beam passes through the uncoated half or portion 30$^b$ of the plate 30, the switches 37, due to the arrangement of the cam 35, is in a closed contact position as shown while the switch contacts 36 are open at this interval. When the shaft 31 is rotated whereby the coated portion 30$^a$ in in the path of the light beam, the position of the switches 37 and 36 are reversed, that is, the contacts 37 are disengaged by the cam 35 while the cam 33 engages and closes the contacts 36.

If the wedge unit 25 is adjusted so that the field, as viewed by the observer, is of one uniform intensity, the variation in intensity as one of the end members 10$_1$ . . . 10$_4$ is displaced when the disc 30 is held stationary will follow the usual $$\cos^2 \frac{\Delta}{2}$$

law wherein ($\Delta$) is the phase difference in wave lengths. This intensity curve is shown in FIG. 4. The intensity curve with one-half of the disc 30 in the light path is shown by the solid curve of FIG. 4. If the disc 30 is rotated whereby the other half of the disc is in the path of the light beam, the intensity curve will be displaced as represented by the dotted curve. The displacement of the two curves, delay or advance, is due to the retardation caused by the deposited layer 30$^a$.

In initial adjustment, white light fringes would be used, but since air path can be compensated for by glass path for approximately 200 fringes (after which the black fringe becomes too colored for accurate setting due to the inequality in the relative dispersions of glass and air). A much better balance can be obtained by alternating the white light source with a monochromatic three wave length source such as produced by a cadmium lamp.

Using visual observation, the adjustable wedge unit 25 is rotated until we have two or three fringes in the field of view, the long compensating wedge unit 39 of FIGS. 3 and 5 is placed in approximately the correct position whereby the glass path in the compensator wedges 39$^a$ and 39$^b$ placed in one arm of the interferometer are approximately equal to that of the plane parallel plate 41 placed in the other arm of the interferometer. One of the adjustable end mirrors or prisms 10$_1$ . . . 10$_4$ is now moved until a black fringe is central in the field. On switching to the double monochromatic cadmium sources, it will be noted that the new fringe ($\lambda$=6438 A.) is slightly displaced relative to that of the blue line ($\lambda$=4800 A.) or still more so from the violet line ($\lambda$=4678 A.).

Returning to white light, the end reflector is moved slightly and the wedge 39$^a$ displaced to compensate. On switching over to cadmium source, it will be found that the relative displacement will be slightly increased or decreased. The appropriate movement, first with the movable end mirror and then with the compensator wedge, is produced until the separation of the red and violet fringe from the mercury source disappears entirely. This means that the glass paths in the two arms are nearly equal and that the air paths are correspondingly close. The adjustable end mirror "adjustment" should now be firmly clamped, or closed, the rotating half-shade plate motor started and the synchronous wedge driving motors allowed to function.

If a permanent recording of the displacement of the end members is desired, this recording may be accomplished with the interferometer of this invention. The photomultiplier would be positioned at or near the eyepoint as in FIG. 1, shown adjacent the focal point for the lens 20 to collect all the radiation. With this substitution, and if the optical paths were fixed nearly in dissonance, the electrical output of the photomultiplier may be plotted or recorded. The curve obtained as the disc 30 is rotated is shown in FIG. 6. The portion of the trace between the lines M and N corresponds to the time intervals when one-half of the disc 30 is in the path of the light beam, while the portion of the curve between the lines O and P corresponds to when the light passes through the other half of the light beam 30. If the switches 36 and 37 are arranged to isolate the photomultiplier output into separate channels, this difference signal can be used both to suitably displace the compensating wedge as discussed hereinabove and to record the displacement on a recorder using any of the well-known methods of servomechanisms. The recorder would be energized and rendered operative at the same time the motor for shaft 31 is energized. The recorder will record the distance $$(10_1 - 10_3) - (10_2 - 10_4)$$

The output signal from the photomultiplier may be applied to a digital counter by means of a cathode follower circuit to directly count the fringes. In this application the half-shaded disc 30 is omitted and a means being provided to indicate a change in direction to allow the counter to count up or down in accordance with the direction of the change.

Now referring to FIG. 7, a modified light divider 12' for use in the interferometer of this invention will be described. The light divider 12' comprises the usual light dividing layer 12D having the properties of partially reflecting and partially transmitting an incident light beam. The light dividing layer 12D is defined between the pair of identical prisms 40 and 42. The prisms 40 and 42 are parallelograms having forty-five degree and one hundred thirty-five degree angles. The forty-five degree angles for each of the prisms 40 and 42 are defined and positioned adjacent the layer 12D at the top right hand corner of FIG. 7, while the one hundred thirty-five degree angles are defined between the layer 12D at the opposite end thereof. The surfaces 40R and 42R for the prisms 40 and 42 respectively are defined as total reflecting surfaces to reflect the light beam to the light divider 12'. Cemented or secured adjacent the reflecting surfaces 40R and 42R respectively there is provided another pair of ninety degree prisms 44 and 46. The acute angles of the ninety degree prisms 44 and 46 are defined as forty-five degree angles. The surfaces defining the hypotenuse for each of the prisms 44 and 46 are arranged in intimate relationship with the reflected surfaces 40R and 42R respectively. In addition, the outer wall 44R and the outer wall 46R are also defined as a totally reflecting surface to control the path of an incident light beam arriving at the light divider 12' externally of the body thereof.

When the light divider 12' is employed in the interferometer of the present invention a light source (not shown) may be arranged at the focal point of the lens 18 arranged opposite the reflecting surface 40R to cause the focused light beam to be reflected therefrom at an angle of forty-five degrees. The light beam is then reflected from the surface 40R to the light dividing layer 12D, where it is partially transmitted and reflected. The light dividing layer 12D separates the incident light beam into two portions disposed at approximately ninety degrees from one another. Each of these portions of the beam leave the light divider 12' and impinge upon the associated end members and experience the double transversal between the end members and return to the light divider 12' at the light dividing surface 12D. Upon returning to the light dividing layer 12D the significant portions of the light beam are either transmitted or reflected to the reflecting surface 42R. The light beams at this time have been recombined and are reflected out of the light divider 12' towards the focusing lens 20 for observation purposes.

Referring now to FIG. 8 another light dividing structure 12" that may be used for measuring the relative lengths of two distances that make an angle 2α with each other will be explained. The angle 2α may be any angle from approximately ten degrees to ninety degrees. The central portion of the light divider 12' comprises two identical prisms 48 and 50. The prisms 48 and 50 are defined whereby the obtuse angles at the outer corner, the bottom right hand corner of the prism 50 as shown in FIG. 8, should be made approximately 90+α degrees. The angle α is indicated between the base of the prism 50 and the dotted line, the dotted line forming a ninety degree angle with the adjacent face of the prism 50. The external obtuse angle for these prisms, and identified for the prism 50, is then made to be approximately 180−2α degrees. The outer surfaces 48ᵃ and 43ᵇ for the prism 48 and the corresponding surfaces 50ᵃ and 50ᵇ for the prism 50 may be considered to be each of unit magnitude. Under these conditions the minimum length of the top sides 48ᶜ or 50ᶜ may be defined by the formula:

$$\frac{\cos \alpha}{\tan 2\alpha}$$

The prisms 48 and 50 are cemented together in such a fashion that the cement layer is parallel and preferably as thin as practical, of the order of a small fraction of a wave length, and also that the inner section of the extension of the planes defining the surfaces 48ᵃ and 50ᵃ will intersect with the extension of the plane of the light dividing layer 12D. The same condition should be true for the intersection of the planes for the surfaces of 48ᵇ and 50ᵇ and the light dividing layer 12D. This latter condition is most important and a simple alignment to produce this condition with telescopes will not be sufficiently accurate. The necessary accuracy for obtaining the above-mentioned conditions can be produced by using the prisms 48 and 50 to act as their own interferometer. If two objective lenses are spaced adjacent the surfaces 48ᵇ and 50ᵇ to provide a plane wavefront entering the prism 48 and the surface 48ᵇ and to observe the divided light beam with the other lens positioned adjacent the surface 50ᵇ, in general the eye will see a number of inclined fringes. The still soft cement layer at the surface 12D may now be gently squeezed out and one prism rotated with respect to the other until the observed field is one uniform tint, at which time the cement may be allowed to set in this position. It may be found convenient under certain circumstances to temporarily silver or produce a reflecting surface at the surfaces 48ᵃ and 50ᵃ for the prisms 48 and 50. This procedure makes the fringes much clearer and easier to observe.

Once having constructed the central portion of the light divider 12' in this fashion, two further cubes 52 and 54 are required to complete the light dividing structure 12". Each of the cubes 52 and 54 comprise two forty-five degree prisms having their hypotenuse 52ᵃ and 54ᵃ, respectively, fully silvered or aluminized to define a totally reflecting surface. The two forty-five degree prisms are cemented together at their hypotenuse, or the total reflecting surfaces 52ᵃ and 54ᵇ, to define the cubes 52 and 54. The surfaces 52ᵇ and 54ᵇ for the cubes 52 and 54 respectively may then be defined as totally reflecting surfaces, as in the other embodiments. The cubes 52 and 54 are cemented to the prisms 48 and 50 by cementing the surface opposite the reflecting surfaces 52ᵇ and 54ᵇ to the surfaces 48ᵇ and 50ᵇ respectively. These prisms should be cemented to have a minimum of pyramidal error with reference to the prisms 48 and 50 and should be arranged so that the reflectors 52ᵃ and 54ᵃ lie in the plane of the paper as shown in FIG. 8, or an an angle of forty-five degrees to this plane, which is preferred in practice.

When using the light divider 12' the light source is arranged and spaced from the objective lens 18 whereby the light beam impinges on the reflecting surface 52ᵃ and is then reflected to the light dividing layer 12D. The divided light beam then experiences the same traversal of light paths between the pair of prisms 10₁ ... 10₄ and is returned to the light dividing portion 12D. Once again the significant portion of the light beams are transmitted or reflected from the dividing surface 12D to impinge upon the reflecting surface 54ᵃ and is then transmitted out of the light divider 12″ to the objective lens 20 to be used for the desired viewing or recording.

The light dividing structure 12″ is particularly suited for determining the degree of annealing of large castings.

It should be noted that when the angle $2\alpha$ approaches ninety degrees, the relationship $$\frac{\cos \alpha}{\tan 2\alpha}$$

approaches zero and the sides $48^c$ and $50^c$ and the corresponding opposite sides for the prisms 48 and 50 disappear whereby the prisms 48 and 50 become a simple cube.

The interferometer shown in FIG. 3, in practice, would probably be arranged whereby each of the end members $10_1 \ldots 10_4$ would be mounted on a separate post with the light divider 12 centrally disposed relative to these end members. It should be noted, however, that the light dividing element 12 need not be centrally located and the interferometer may be arranged in a more economical fashion by utilizing only three posts. With this construction, two of the end members and the light dividing element 12 may be mounted in spaced relationship on a single post, with separate posts for the other two remaining end members. The arms of the end members mounted on a separate post will now be twice the length as in the first described embodiment.

It will now be appreciated that the present invention has advanced the state of the interferometer art through the provision of a substantially permanent and more sensitive interferometer. The light divider for the interferometer may be of any construction that divides a light beam in two portions normal to each other and of a unitary construction whereby the double traversal of the light path effects a compensation for any movement or rotation of the light divider.

Likewise, any end reflector that provides the desired parallel but displaced back reflection or any of the well-known techniques for compensating for differences in the air and/or glass paths may be substituted for those described herein.

What is claimed is:

1. An interferometer including a plurality of light reflecting elements each defined to receive an incident light beam on one surface thereof and to back reflect the light beam whereby it emerges from said one surface at a point displaced from the point of incidence, said plurality of light reflecting elements are spaced apart and arranged in two pairs whereby a light beam reflected from one element of a pair is received by the other element of the same pair, a light dividing element arranged intermediate the two pairs of light reflecting elements, said light dividing element including a surface defined to partially transmit and partially reflect an incident light beam, a totally reflecting surface arranged opposite one of said light reflecting elements of each of said pairs of elements, means for directing a light beam to impinge on said partially reflecting surface of said light dividing element to cause the transmitted portions and the reflected portions of said incident light beam to emerge therefrom in a substantially perpendicular relationship to be received by one of said light reflecting elements of each pair, said total reflecting surfaces are arranged relative to the said other reflecting elements of each pair for reflecting the light beam back to its path to said other element to re-traverse a path from said other element to said one element of each pair of reflecting elements for recombination at the partially reflecting surface of the light divider, and means for receiving the recombined light beam.

2. An interferometer as defined in claim 1 wherein said light dividing element including the partial reflecting surface and the total reflecting surfaces is constructed as a unitary structure whereby any displacement or rotation of said dividing element produces no change in the light path traversed.

3. An interferometer as defined in claim 2 wherein said means for receiving said light beam includes means for recording the interference pattern corresponding to the movement of said reflecting elements.

4. An interferometer as defined in claim 1 wherein said light divider is arranged substantially centrally of said two pair of light reflecting elements and including means arranged intermediate said light divider and preselected ones of said light reflecting elements for correcting any differences in the lengths of the paths of the divided light beams.

5. An interferometer as defined in claim 1 wherein said light dividing element is defined as a unitary optical element and includes another pair of totally reflecting surfaces internally disposed within said unitary element, one of said reflecting surfaces is arranged and disposed to receive an incident light beam and to reflect it towards said partial reflecting surface at an angle of incidence to cause the recited division of the light beam, the other of said reflecting surfaces is arranged and disposed relative to said partial reflecting surface to receive the recombined light beam therefrom and to reflect same out of the light dividing element proper.

6. An interferometer including a plurality of light reflecting elements each defined to receive an incident light beam on one surface thereof and to back reflect the light beam whereby it emerges from said one surface at a point displaced from the point of incidence, said plurality of light reflecting elements are spaced apart and arranged in two pairs whereby a light beam reflected from one element of a pair is received by the other element of the same pair, a light dividing element arranged substantially centrally relative to the two pairs of light reflecting elements, said light dividing element including a surface defined to partially transmit and partially reflect an incident light beam and a totally reflecting surface arranged opposite one of said light reflecting elements of each of said pairs of elements, means for arranging a light beam to impinge on said partial reflecting surface of said light dividing element whereby the transmitted portions and the reflected portions of said incident light beam emerge therefrom in a substantially perpendicular relationship to be received by one of said light reflecting elements of each pair, the light beam being reflected from said one element of each pair in a path not interfering with the incident beam and not passing through the light divider to be received by the other element of each pair and thence to the adjacent total reflecting surfaces of the light divider, the incident light beams being reflected back from the adjacent reflecting surfaces of the light divider and to cause a re-traversal of the same path from said other element to said one element of each pair to once again impinge and be recombined on the partial reflecting surface of the light divider to thereby cause the light beams to traverse the thus defined light path between each pair of light reflecting elements twice and to be intercepted by said partially reflecting surface twice, and means for receiving and observing the recombined light beam.

7. An interferometer including a light divider including a surface defined to partially transmit and partially reflect an incident light beam and to cause the portions of the divided light beam to travel paths substantially normal to one another and including a pair of reflecting surfaces disposed relative to said partial reflecting surface whereby one of said surfaces reflects an incident light beam external to said light divider to impinge on said partial reflector while the remaining one of said reflecting surfaces is disposed to receive a light beam from said partial reflecting surface and to reflect it out of said light divider, a pair of light reflecting members spaced from said light divider to each receive one of the portions of the divided light beam from said partial reflecting surface and to reflect the incident portion back towards said light divider but vertically displaced out of the path of the light divider and the light beam emerging from said divider, another pair of light reflecting members defined the same as said first mentioned pair, each one of said last mentioned pair of light reflecting members being arranged and spaced from a side of said light divider opposite one of said first mentioned pair to receive the light beam reflected from said one member and to reflect it toward said light dividing member, said light dividing member being further defined with a reflecting surface disposed adjacent each one of said another pair of light reflecting members to back-reflect the incident light beam on its path to each one of said another pair of light reflecting members and then to said first-mentioned pair of light reflecting members whereby it is restored to its original level to thereby impinge on said partially reflecting surface, and means disposed relative to the reflecting surface of said light divider causing the light beam to leave said divider for observing the light beam.

8. An interferometer including a plurality of light reflecting elements comprising a homogeneous light transmitting body having a plane front surface and substantially perpendicular side walls, two pairs of reflecting end walls each defined by a pair of intersecting planes disposed at approximately a forty-five degree angle with said front surface, and a plane reflecting end wall parallel with said front wall and intersecting each end wall whereby a light beam impinging on said front face is successively reoriented by each of said end walls to thereby cause the light beam to emerge from the front face in a plane parallel to the impinging beam but displaced therefrom, said plurality of light reflecting elements are spaced apart and arranged in two pairs whereby a light beam reflected from one element of a pair is received by the other element of the same pair, a light dividing element arranged substantially centrally of the two pairs of light reflecting elements, said light dividing element including a surface defined to partially transmit and partially reflect an incident light beam and a totally reflecting surface arranged opposite one of said light reflecting elements of each of said pairs of elements, means for producing a light beam having a substantially plane wave front and for directing to impinge on said partial reflecting surface of said light dividing element whereby the transmitted portions and the reflected portions of said incident light beam emerge therefrom in a substantially perpendicular relationship to be received at one of said light reflecting elements of each pair, the light beam being reflected from said one element of each pair to be received by the other element of each pair and thence to the adjacent total reflecting surfaces of the light divider, the incident light beams being back-reflected from the adjacent reflecting surface of the light divider for traversing a path from said other element to said one element of each pair to once again impinge and be recombined on the partial reflecting surface of the light divider, and means for receiving the recombined light beam.

9. An interferometer as defined in claim 8 wherein each of said light reflecting elements include ninety degree roofs.

References Cited in the file of this patent

UNITED STATES PATENTS

| 2,472,600 | Luboshez | June 7, 1949 |
| 2,523,687 | Erban | Sept. 26, 1950 |
| 2,571,937 | Peck | Oct. 16, 1951 |
| 2,583,596 | Root | Jan. 29, 1952 |

FOREIGN PATENTS

| 1,030,059 | Germany | May 14, 1958 |